United States Patent
Patel et al.

(10) Patent No.: US 12,540,269 B2
(45) Date of Patent: Feb. 3, 2026

(54) CEMENTING A WELLBORE USING A DIRECT INK PRINTING

(71) Applicants: Saudi Arabian Oil Company, Dhahran (SA); William Marsh Rice University, Houston, TX (US)

(72) Inventors: Hasmukh A. Patel, Katy, TX (US); Ali Zein Khater, Houston, TX (US); Peter Boul, Houston, TX (US); Pulickel M. Ajayan, Houston, TX (US); Muhammad M. Rahman, Houston, TX (US)

(73) Assignees: William Marsh Rice University, Houston, TX (US); Saudi Arabian Oil Company, Dhahran (SA)

( * ) Notice: Subject to any disclaimer, the term of this patent is extended or adjusted under 35 U.S.C. 154(b) by 425 days.

(21) Appl. No.: 17/551,051

(22) Filed: Dec. 14, 2021

(65) Prior Publication Data

US 2023/0183546 A1 Jun. 15, 2023

(51) Int. Cl.
*E21B 33/14* (2006.01)
*C04B 22/00* (2006.01)
*C04B 24/02* (2006.01)
*C04B 24/26* (2006.01)
*C04B 28/02* (2006.01)
*C09K 8/467* (2006.01)
(Continued)

(52) U.S. Cl.
CPC .......... *C09K 8/467* (2013.01); *C04B 22/0093* (2013.01); *C04B 24/02* (2013.01); *C04B 24/2647* (2013.01); *C04B 28/02* (2013.01); *E21B 33/14* (2013.01); *C04B 2103/0079* (2013.01); *C04B 2103/50* (2013.01); *C04B 2111/00146* (2013.01); *C04B 2111/00181* (2013.01)

(58) Field of Classification Search
CPC ............................... C09K 8/467; E21B 33/14
USPC ......................................................... 166/285
See application file for complete search history.

(56) References Cited

U.S. PATENT DOCUMENTS

| 1,811,799 A | 6/1931 | Lukens |
| 2,705,050 A | 3/1955 | Davis et al. |

(Continued)

FOREIGN PATENT DOCUMENTS

| BR | 102018014722 | 4/2020 |
| CN | 104204035 | 12/2014 |

(Continued)

OTHER PUBLICATIONS

Xu et al., "Multi-Material Direct Ink Writing (DIW) for Complex 3D Metallic Structures with Removable Supports," ACS Appl. Mater. Interfaces, 2019, 11:8499-8506, 8 pages.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

Methods and systems for cementing a wellbore are described. The methods include forming a slurry including a cement-based matrix, water, a polymer-based additive, and a rheology modifying agent; mixing the slurry to form a printing ink; introducing the slurry and a printer into a wellbore; and forming a cement-based composite structure in the wellbore by printing a plurality of layers using the printing ink.

19 Claims, 9 Drawing Sheets

(51) Int. Cl.
*C04B 103/00* (2006.01)
*C04B 103/50* (2006.01)
*C04B 111/00* (2006.01)

(56) References Cited

U.S. PATENT DOCUMENTS

| | | | |
|---|---|---|---|
| 3,301,797 A | 1/1967 | Drucket et al. | |
| 3,481,903 A | 12/1969 | Alelio | |
| 3,887,009 A | 6/1975 | Miller et al. | |
| 3,938,594 A | 2/1976 | Rhudy et al. | |
| 4,137,182 A | 1/1979 | Golinkin | |
| 4,272,430 A | 6/1981 | Pieh et al. | |
| 4,615,809 A | 10/1986 | King | |
| 4,771,112 A | 9/1988 | Engelbrecht | |
| 4,797,433 A | 1/1989 | Lahalih | |
| 4,883,126 A | 11/1989 | Leland | |
| 5,007,481 A | 4/1991 | Williams et al. | |
| 5,062,897 A | 11/1991 | Katsunnata | |
| 5,159,828 A | 11/1992 | Steiger | |
| 5,352,290 A | 10/1994 | Takeshita et al. | |
| 5,401,312 A | 3/1995 | Hanst | |
| 5,645,637 A | 7/1997 | Yaniv | |
| 5,891,983 A | 4/1999 | Albrecht | |
| 6,089,318 A | 7/2000 | Laramay et al. | |
| 6,324,916 B1 | 12/2001 | Jessop | |
| 6,609,067 B2 | 8/2003 | Tare | |
| 6,664,215 B1 | 12/2003 | Tomlinson | |
| 6,668,927 B1 | 12/2003 | Chatterji et al. | |
| 6,828,378 B2 | 12/2004 | Okumura et al. | |
| 6,844,852 B1 | 1/2005 | Simons | |
| 7,077,199 B2 | 7/2006 | Vinegar et al. | |
| 7,497,258 B2 | 3/2009 | Savery et al. | |
| 7,523,784 B2 | 4/2009 | Lewis et al. | |
| 7,525,872 B2 | 4/2009 | Tang et al. | |
| 7,527,098 B2 | 5/2009 | Santra et al. | |
| 7,555,414 B2 | 6/2009 | Calhoun | |
| 7,612,142 B2 | 11/2009 | Ito et al. | |
| 7,622,527 B2 | 11/2009 | Ito et al. | |
| 7,637,319 B2 | 12/2009 | Savery et al. | |
| 7,654,326 B1 | 2/2010 | Santra et al. | |
| 7,773,454 B2 | 8/2010 | Barolak et al. | |
| 7,787,327 B2 | 8/2010 | Tang et al. | |
| 7,799,867 B2 | 9/2010 | Ito et al. | |
| 7,833,344 B2 | 11/2010 | Santra et al. | |
| 7,847,049 B2 | 12/2010 | Ito et al. | |
| 7,893,011 B2 | 2/2011 | Lewis et al. | |
| 7,893,168 B2 | 2/2011 | Ito et al. | |
| 7,943,718 B2 | 5/2011 | Ito et al. | |
| 7,981,943 B2 | 7/2011 | Ito et al. | |
| 8,007,911 B2 | 8/2011 | Ito et al. | |
| 8,017,688 B2 | 9/2011 | Ito et al. | |
| 8,124,569 B2 | 2/2012 | Khan et al. | |
| 8,142,562 B2 | 3/2012 | Klettke et al. | |
| 8,309,498 B2 | 11/2012 | Funkhouser et al. | |
| 8,382,476 B2 | 2/2013 | Schulte et al. | |
| 8,418,763 B1 | 4/2013 | Deen et al. | |
| 8,450,252 B2 | 5/2013 | Funkhouser et al. | |
| 8,450,415 B2 | 5/2013 | Ito et al. | |
| 8,580,906 B2 | 11/2013 | Hayashi et al. | |
| 8,587,493 B2 | 11/2013 | Dickey et al. | |
| 8,620,636 B2 | 12/2013 | Zhan et al. | |
| 8,673,364 B2 | 3/2014 | Jalota et al. | |
| 8,770,038 B2 | 7/2014 | Secq | |
| 8,899,331 B2 | 12/2014 | Burnham | |
| 9,023,150 B2 | 5/2015 | Brenneis et al. | |
| 9,068,051 B2 | 6/2015 | Yamasaki et al. | |
| 9,085,487 B2 | 7/2015 | Da Silva et al. | |
| 9,163,499 B2 | 10/2015 | Adams et al. | |
| 9,228,993 B2 | 1/2016 | Shine et al. | |
| 9,266,972 B2 | 2/2016 | Yamasaki et al. | |
| 9,375,699 B2 | 6/2016 | Ladet | |
| 9,428,682 B2 | 8/2016 | Muthusamy et al. | |
| 9,617,460 B2 | 4/2017 | Reddy | |
| 9,708,869 B2 | 7/2017 | Sarmah et al. | |
| 10,009,994 B2 | 6/2018 | Sawada et al. | |
| 10,048,336 B2 | 8/2018 | Hakimuddin | |
| 10,060,242 B2 | 8/2018 | Benoit et al. | |
| 10,150,905 B1 | 12/2018 | Reddy | |
| 10,202,535 B2* | 2/2019 | Cavo | C09K 8/428 |
| 10,351,758 B2 | 7/2019 | Hull et al. | |
| 10,647,909 B2 | 5/2020 | Li et al. | |
| 10,836,950 B1 | 11/2020 | Patel et al. | |
| 10,871,061 B2 | 12/2020 | Hull et al. | |
| 10,913,683 B2* | 2/2021 | Rahman | B28B 1/001 |
| 10,966,317 B2 | 3/2021 | Abe et al. | |
| 11,078,406 B2 | 8/2021 | Hull et al. | |
| 11,130,900 B2 | 9/2021 | Patel et al. | |
| 11,230,497 B2 | 1/2022 | Patel et al. | |
| 2003/0138398 A1 | 7/2003 | Okumura et al. | |
| 2006/0048671 A1 | 3/2006 | Ong | |
| 2008/0006410 A1 | 1/2008 | Looney et al. | |
| 2008/0156225 A1 | 7/2008 | Bury | |
| 2008/0287633 A1 | 11/2008 | Drumheller | |
| 2009/0030108 A1 | 1/2009 | Ito et al. | |
| 2009/0214871 A1 | 8/2009 | Fukuda et al. | |
| 2009/0312491 A1 | 12/2009 | Ito et al. | |
| 2009/0312492 A1 | 12/2009 | Ruslim et al. | |
| 2010/0006288 A1 | 1/2010 | Santra et al. | |
| 2012/0006551 A1 | 1/2012 | Carman et al. | |
| 2012/0322695 A1 | 12/2012 | Kefi et al. | |
| 2013/0118740 A1 | 5/2013 | Sherman et al. | |
| 2014/0096964 A1 | 4/2014 | Chakraborty et al. | |
| 2014/0342531 A1 | 11/2014 | Tominaga et al. | |
| 2015/0024122 A1 | 1/2015 | Wu et al. | |
| 2015/0033719 A1 | 2/2015 | Lawrence et al. | |
| 2015/0057196 A1 | 2/2015 | Debord et al. | |
| 2015/0061669 A1 | 3/2015 | Hakimuddin | |
| 2015/0152724 A1 | 6/2015 | Amendt et al. | |
| 2015/0198008 A1 | 7/2015 | Smith et al. | |
| 2016/0102238 A1 | 4/2016 | Muthusamy et al. | |
| 2016/0177655 A1 | 6/2016 | Fripp | |
| 2016/0264813 A1 | 9/2016 | Sawada et al. | |
| 2017/0066959 A1 | 3/2017 | Hull et al. | |
| 2017/0218248 A1 | 8/2017 | Boul et al. | |
| 2017/0369761 A1 | 12/2017 | Jones et al. | |
| 2018/0045870 A1 | 2/2018 | Asahi et al. | |
| 2018/0215988 A1 | 8/2018 | Gamwell et al. | |
| 2018/0251649 A1 | 9/2018 | Lewis | |
| 2018/0335494 A1 | 11/2018 | Hakimuddin | |
| 2019/0054536 A1 | 2/2019 | Xu et al. | |
| 2019/0077071 A1 | 3/2019 | Ware et al. | |
| 2019/0144569 A1* | 5/2019 | Ke | B33Y 70/00 428/159 |
| 2019/0211658 A1 | 7/2019 | Hull et al. | |
| 2019/0310396 A1 | 10/2019 | Matsumoto et al. | |
| 2020/0277441 A1 | 9/2020 | Stoddart et al. | |
| 2020/0308341 A1 | 10/2020 | Yan et al. | |
| 2020/0325070 A1 | 10/2020 | Patel et al. | |
| 2021/0024806 A1 | 1/2021 | Patel et al. | |
| 2021/0024808 A1 | 1/2021 | Schipper et al. | |
| 2021/0024814 A1 | 1/2021 | Schipper et al. | |
| 2021/0087419 A1 | 3/2021 | Zhu et al. | |
| 2021/0101833 A1 | 4/2021 | Thaemlitz et al. | |
| 2021/0102112 A1* | 4/2021 | Patel | C04B 24/2641 |
| 2021/0130676 A1* | 5/2021 | Patel | C04B 24/2682 |
| 2021/0198558 A1 | 7/2021 | Hull et al. | |
| 2021/0198559 A1 | 7/2021 | Hull et al. | |
| 2021/0222055 A1 | 7/2021 | Schipper et al. | |
| 2021/0302292 A1 | 9/2021 | Boul et al. | |
| 2021/0379655 A1 | 12/2021 | Ren | |

FOREIGN PATENT DOCUMENTS

| | | |
|---|---|---|
| CN | 107522436 | 12/2017 |
| CN | 109133754 | 1/2019 |
| CN | 112456870 | 3/2021 |
| EP | 0383348 | 8/1990 |
| EP | 2820413 | 1/2015 |
| EP | 3060909 | 8/2016 |
| JP | H 10158045 | 6/1998 |
| JP | 2016088878 | 5/2016 |
| JP | 6647751 | 2/2020 |
| WO | WO 2016053319 | 4/2016 |

(56) References Cited

FOREIGN PATENT DOCUMENTS

| WO | WO 2016080674 | 5/2016 |
|----|---------------|--------|
| WO | WO 2019090140 | 5/2019 |
| WO | WO 2019147559 | 8/2019 |

OTHER PUBLICATIONS

U.S. Appl. No. 17/575,177, filed Jan. 13, 2022, Sajadi et al.

Elder et. al., "Nanomaterial Patterning in 3D Printing", Adv. Mater., 32, 1907142, 2020, 43 pages.

Falahati et. al., "Smart polymers and nanocomposites for 3D and 4D printing," Materials Today, Nov. 2020, vol. 40: 215-245, 31 pages.

Hu et. al., "Laser additive manufacturing bulk graphene-copper nanocomposites," Nanotechnology 28: 445705, 2017, 10 pages.

Kohler et al., "Mixing of Commercially Available 3D Printing Filaments for Novel RF Components," 2020 International Conference on Software, Telecommunications and Computer Networks (SoftCOM), Split, Croatia, 2020, 1-6, 6 pages.

Lewis et.al, "Direct Ink Writing of Three-Dimensional Ceramic Structures," J. Am. Ceram. Soc., 89(12): 3599-3609, 2006, 11 pages.

Ravanbakhsh et. al., "Composite Inks for Extrusion Printing of Biological and Biomedical Constructs," ACS Biomater. Sci. Eng., 7: 4009-4026, 2021, 18 pages.

U.S. Appl. No. 16/393,016, filed Apr. 24, 2019, Hakimuddin et al.
U.S. Appl. No. 16/593,820, filed Oct. 4, 2019, Patel et al.
U.S. Appl. No. 16/668,730, filed Oct. 30, 2019, Patel et al.
U.S. Appl. No. 17/107,428, filed Nov. 30, 2020, Hull et al.
U.S. Appl. No. 17/196,273, filed Mar. 9, 2021, Santra et al.
U.S. Appl. No. 17/550,631, filed Dec. 14, 2021, Patel et al.
U.S. Appl. No. 17/550,638, filed Dec. 14, 2021, Patel et al.
U.S. Appl. No. 63/289,308, filed Dec. 14, 2021, Hull et al.

Acquah et al., "Carbon Nanotubes and Graphene as Additives in 3D Printing," Carbon Nanotubes—Current Progress of Their Polymer Composites, InTech, 2016, 26 pages.

Adhikary et al., "Effects of carbon nanotubes on expanded glass and silica aerogel based lightweight concrete," Nature, Scientific Reports, Jan. 2021, 11:2104, 11 pages.

Agartan et al., "$CO_2$ storage in depleted oil and gas fields in the Gulf of Mexico." International Journal of Greenhouse Gas Control 72, May 2018, 38-48, 11 pages.

Andrew, "Global $CO_2$ emissions from cement production," Earth Syst. Sci. Data, Jan. 2018, 10:195-217, 23 pages.

API, "10B-2, Recommended Practice for Testing Well Cements," American Petroleum Institute, Apr. 2019, 1-124, RP 10B-2, 124 pages.

Arbad et al., "A Review of Recent Research on Contamination of Oil Well Cement with Oil-Based Drilling Fluid and the Need of New and Accurate Correlations," ChemEngineering, Apr. 2020, 20 pages.

Arts et al., "Seismic monitoring at the Sleipner underground $CO_2$ storage site (North Sea)," in Baines et al., Geologic Storage of Carbon Dioxide. London: Geologic Society Special Publications, Jan. 2004, 11 pages.

Ashik et al., "A review on methane transformation to hydrogen and nanocarbon: Relevance of catalyst characteristics and experimental parameters on yield," Renewable and Sustainable Energy Reviews, Sep. 2017, 76:743-767, 25 pages.

Asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

Bagheri et al., "Rubber-toughened epoxies: a critical review." Journal of Macromolecular Science®, Part C: Polymer Reviews 49.3, Aug. 2009, 201-225, 25 pages.

Bett, Geothermal Well Cementing, Materials and Placement Techniques, 2010, 32 pages.

Beyer, Daniel. "Evolution of reservoir properties in the Lower Triassic aquifer sandstones of the Thuringian Syncline in Central Germany" Diss., 2015, 221 pages.

Bouzalakos et al., "Overview of carbon dioxide ($CO_2$) capture and storage technology" Developments and Innovation in Carbon Dioxide ($CO_2$) Capture and Storage Technology, Jan. 2010, 24 pages.

Brichni et al., "Optimisation of Magnesium Oxychloride Cement Properties by Silica Glass," Adv. Cem. Res., Jul. 2016, 28:10, 654-663, 10 pages.

Buchanan et al., "Metal 3D printing in construction: A review of methods, research, applications, opportunities and challenges," Engineering Structures, Feb. 2019, 180:332-348, 36 pages.

Cao et al., "Study of the in-situ growth of carbon nanofibers on cement clinker," Mater. Res. Express, May 2020, 7:5 (055306), 10 pages.

Capper et al., "Internal antiplasticisation in highly crosslinked amine cured multifunctional epoxy resins," Polymer, 2018, 146:321-330, 11 pages.

Carey et al., "Fracture-permeability behavior of shale," Journal of unconventional oil and gas resources, Sep. 2015, 11, 53 pages.

Ceglar et al., "Deepwater outcrop analogue study: basal Bunkers Sandstone, Donkey Bore Syncline, Northern Flinders Ranges, Australia" PESA Eastern Australia Basins Symposium II. Adelaide, 2004, 11 pages.

Chambers et al., "Liquid crystal elastomer-nanoparticle systems for actuation," Journal of Materials Chemistry, 2009, 19.11:1524-1531, 7 pages.

Chatham et al., "A review of the process physics and material screening methods for polymer powder bed fusion additive manufacturing," Progress in Polymer Science, Jun. 2019, 93:68-95, 28 pages.

Chen et al., "Enhancement of mechanical and wear resistance performance in hBN reinforced epoxy nanocomposites," Polym. Int., 2017, 66: 659, 25 pages.

Chen et al., "Rapid control of phase growth by nanoparticles," Nature communications, May 2014, 5.1, 9 pages.

Cho et al., "Cell-Encapsulating Hydrogel Puzzle: Polyrotaxane-Based Self-Healing Hydrogels," Chem. Eur. J., 2019, 26:4 (913-920), 22 pages.

Choi et al., "Highly elastic binders integrating polyrotaxanes for silicon microparticle anodes in lithium ion batteries." Science 357.6348, Jul. 2017, 279-283, 5 pages.

Cordero et al., "Strengthening of ferrous binder jet 3D printed components through bronze infiltration," Additive Manufacturing, May 2017, 15:87-92, 6 pages.

Cui et al., "Electrical and mechanical properties of electrically conductive adhesives from epoxy, micro-silver flakes, and nano-hexagonal boron nitride particles after humid and thermal aging," International Journal of Adhesion and Adhesives, Jul. 2013, 44:232-236, 5 pages.

Davidson et al., "3D Printable and Reconfigurable Liquid Crystal Elastomers with Light-Induced Shape Memory via Dynamic Bond Exchange," Advanced Materials, Jan. 2020, 6 pages.

DebRoy et al., "Additive manufacturing of metallic components—process, structure and properties," Progress in Materials Science, Mar. 2018, 92:112-224, 114 pages.

DebRoy et al., "Scientific, technological and economic issues in metal printing and their solutions," Nature Materials, Jul. 2019, 18, 7 pages.

Dowling et al., "A review of critical repeatability and reproducibility issues in powder bed fusion," Materials & Design, Jan. 2020, 186, 18 pages.

Eiken et al., "Lessons learned from 14 years of CCS operations: Sleipner, in Salah and Snøhvit." Energy procedia 4, Jan. 2011, 5541-5548, 8 pages.

El-Wardany et al., "Challenges in three-dimensional printing of high-conductivity copper," Journal of Electronic Packaging, Jun. 2018, 140.2:020907, 12 pages.

Enayatpour et al., "Advanced Modeling of Cement Displacement Complexities" SPE/IADC-184702-MS, SPE/IADC Drill Conference and Exhibition, Mar. 2017, 21 pages.

Fayazfar et al., "A critical review of powder-based additive manufacturing of ferrous alloys: Process parameters, microstructure and mechanical properties," Materials & Design, Apr. 2018, 144:98-128, 31 pages.

(56) References Cited

OTHER PUBLICATIONS

Foldyna et al., "Dispersion of carbon nanotubes for application in cement composites," Science Direct, Procedia Engineering, 2016, 149:94-99, 6 pages.

Funkhouser and Norman, "Synthetic Polymer Fracturing Fluid for High-Temperature Application," SPE 80236, Society of Petroleum Engineers (SPE), International Symposium on Oilfield Chemistry, Feb. 5-7, 2003, 6 pages.

Gaillard et al., "Novel Associative Acrylamide-based Polymers for Proppant Transport in Hydraulic Fracturing Fluids," SPE 164072, Society of Petroleum Engineers (SPE), SPE International Symposium on Oilfield Chemistry, Apr. 8-10, 2013, 11 pages.

Gelebart et al., "Photoresponsive fiber array: toward mimicking the collective motion of cilia for transport applications," Advanced Functional Materials, Aug. 2016, 26.29:5322-5327, 6 pages.

Genedy et al., "Examining epoxy-based nanocomposites in wellbore seal repair for effective $CO_2$ sequestration," Energy Procedia, Jan. 2014, 63:5798-5807, 10 pages.

Gislason et al., "Carbon storage in basalt." Science 344.6182, Apr. 2014, 373-374, 2 pages.

Gladman et al., "Biomimetic 4D printing," Nature materials, Apr. 2016, 15.4:413-418, 7 pages.

Global Status of CCS Report, Dec. 11, 2020, Global CCS Institute, 44 pages.

Goeppert et al., "Air as the renewable carbon source of the future: an overview of $CO_2$ capture from the atmosphere," Energy Environ. Sci., 2012, 5: 7833, 12 pages.

Gojny et al., "Carbon nanotube-reinforced epoxy-composites: enhanced stiffness and fracture toughness at low nanotube content," Compos. Sci. Technol., 2004, 64:2363-2371, 9 pages.

Gong et al., "Analysis of defect generation in Ti—6Al—4V parts made using powder bed fusion additive manufacturing processes," Additive Manufacturing, Oct. 2014, 1, 60 pages.

Gorsse et al., "Additive manufacturing of metals: a brief review of the characteristic microstructures and properties of steels, Ti—6Al—4V and high-entropy alloys," Science and Technology of advanced Materials, Dec. 2017, 18.1:584-610, 28 pages.

Guo et al., "Shape memory epoxy composites with high mechanical performance manufactured by multi-material direct ink writing," Compos. Part A Appl. Sci. Manuf., 2020, 135: 105903, 8 pages.

Gupta and Carman, "Fracturing Fluid for Extreme Temperature Conditions is Just as Easy as the Rest," SPE 140176, Society of Petroleum Engineers (SPE), SPE Hydraulic Fracturing Technology Conference, Jan. 24-26, 2011, 5 pages.

Hannis et al., "$CO_2$ Storage in Depleted or Depleting Oil and Gas Fields: What can We Learn from Existing Projects?" Energy Procedia, 2017, 114, 5680-5690, 11 pages.

Harada et al., "Preparation and properties of inclusion complexes of polyethylene glycol with .alpha.-cyclodextrin," Macromolecules, 1993, 26:5698-5703, 6 pages.

Harada et al., "Supramolecular polymeric materials via cyclodextrin-guest interactions." Accounts of chemical research 47.7, Jul. 2014, 2128-2140, 13 pages.

Hart et al., "Material properties and applications of mechanically interlocked polymers," Nat. Rev. Mater., 2021, 6:6 (508-530), 23 pages.

Hepburn et al., "The technological and economic prospects for $CO_2$ utilization and removal," Nature, Nov. 2019, 575, 11 pages.

Herzog et al., "Additive Manufacturing of Metals," Acta Mater. 2016, 117:371-392, 22 pages.

Hitzler et al., "In-plane anisotropy of selective laser-melted stainless steel: The importance of the rotation angle increment and the limitation window," Proceedings of the Institution of Mechanical Engineers, Part L: Journal of Materials: Design and Applications, Jul. 2019, 233.7:1419-1428, 10 pages.

Hojjatzadeh et al., "Direct observation of pore formation mechanisms during LPBF additive manufacturing process and high energy density laser welding," International Journal of Machine Tools and Manufacture 153:103555, Jun. 2020, 32 pages.

Houben et al., "Plasticization behavior of crown-ether containing polyimide membranes for the separation of $CO_2$," Separation and Purification Technology, 2021, 255:117307, 10 pages.

Hoyos-Palacio et al., "Catalytic effect of Fe, Ni, Co and Mo on the CNTs production," IOP Conference Series: Materials Science and Engineering, 2014, 59:012005, 9 pages.

Huang et al., "Finite element analysis of thermal behavior of metal powder during selective laser melting," International Journal of Thermal Sciences, Jun. 2016, 104:146-157, 12 pages.

Hull et al., "Chemomechanical Effects of Oxidizer-$CO_2$ Systems Upon Hydraulically Fractured Unconventional Source Rock," Canadian Journal of Chemical Engineering, 2021, 26 pages.

Hull et al., "Oxidative Kerogen Degradation: A Potential Approach to Hydraulic Fracturing in Unconventionals," Energy Fuels, 2019, 33: 4758-4766, 8 pages.

Hull et al., "Synthesis and structural characterization of $CO_2$-soluble oxidizers [Bu4N]BrO3 and [Bu4N]ClO3 and their dissolution in cosolvent-modified $CO_2$ for reservoir applications," RSC Advances, Royal Society of Chemistry, Dec. 21, 2020, 10: 44973, 8 pages.

Hur et al., "Reactive force fields for modeling oxidative degradation of organic matter in geological formations," RSC Adv. 2021, 11:29298-29307, 23 pages.

Isaka et al., "Influence of long-term operation of supercritical carbon dioxide based enhanced geothermal system on mineralogical and microstructurally-induced mechanical alteration of surrounding rock mass," Renewable Energy, Jun. 2019, 136, 14 pages.

Isfahani et al., "Dispersion of multi-walled carbon nanotubes and its effects on the properties of cement composites," Cement and Concrete Composites, Nov. 2016, 74:154-163, 10 pages.

Isobe et al., "Thermally dissociable pseudo-polyrotaxane as a supramolecular shrinkage suppressor for epoxy-amine curing system." Journal of Polymer Science Part A: Polymer Chemistry 46.6, Mar. 2008, 2305-2308, 4 pages.

Jafariesfad et al., "Cement Sheath Modification Using Nanomaterials for Long-term Zonal Isolation of Oil Wells: Review" Journal of Petroleum Science and Engineering., 156, 2017, 662-672, 28 pages.

Jiang et al., "Highly Stretchable and Instantly Recoverable Slide-Ring Gels Consisting of Enzymatically Synthesized Polyrotaxane with Low Host Coverage," Chem. Mater., 2018, 30:15 (5013), 10 pages.

Jin et al., "Synthesis and application of epoxy resins: A review." Journal of Industrial and Engineering Chemistry 29, Sep. 2015, 11 pages.

Kato et al., "Organic-Inorganic Hybrid Slide-Ring Gels: Polyrotaxanes Consisting of Poly(dimethylsiloxane) and γ-Cyclodextrin and Subsequent Topological Cross-Linking" Macromolecules 42, 18, Aug. 2009, 7129-7136, 8 pages.

Khuenkaew et al., "Resistance spot welding of SUS316L austenitic/ SUS425 ferritic stainless steels: weldment characteristics, mechanical properties, phase transformation and solidification," Metals, Jun. 2019, 9.6, 17 pages.

Kim et al., "Development of $CO_2$-Selective Polyimide-Based Gas Separation Membranes Using Crown Ether and Polydimethylsiloxane," Polymers, 2021, 13:1927, 15 pages.

Koyanagi et al., "Movable cross-linked polymeric materials from bulk polymerization of reactive polyrotaxane cross-linker with acrylate monomers." Macromolecules 50.15, Aug. 2017, 5695-5700, 6 pages.

Kuo et al., "Bonding behavior of repair material using fly-ash/ ground granulated blast furnace slag-based geopolymer," Materials, Jan. 2019, 12.10, 16 pages.

Ladva et al., "The Cement-to-Formation Interface in Zonal Isolation," IADC/SPE 88016, Society of Petroleum Engineers (SPE), presented at the IADC/SPE Asia Pacific Drilling Technology Conference and Exhibition in Kuala Lumpur, Malaysia, Sep. 13-15, 2004, 369-382, 14 pages.

Levenfeld et al., "Effect of residual carbon on the sintering process of M2 high speed steel parts obtained by a modified metal injection molding process," Metallurgical and Materials Transactions, Jun. 2002, A:33.6 (1843-1851), 9 pages.

(56) References Cited

OTHER PUBLICATIONS

Lewis et al., "Direct ink writing of three-dimensional ceramic structures," Journal of the American Ceramic Society, Dec. 2006, 89.12:3599-3609, 11 pages.
Li et al., "Contamination of Cement Slurries with Diesel-Based Drilling Fluids in a Shale Gas Well," J. Nat. Gas Sci. Eng., Aug. 2015, 27:1312-1320, 9 pages.
Li et al., "Residual stress in metal additive manufacturing," Procedia Cirp, Jan. 2018, 71:348-353, 6 pages.
Li et al., "Slide-ring shape memory polymers with movable cross-links," React. Funct. Polym., 2017, 119:26-36, 25 pages.
Li et al., "The pore-fracture system properties of coalbed methane reservoirs in the Panguan Syncline, Guizhou, China." Geoscience Frontiers, Nov. 2012, 3, 853-862, 10 pages.
Lin et al., "Rapid macroscale shape morphing of 3D-printed polyrotaxane monoliths amplified from pH-controlled nanoscale ring motions," J. Mater. Chem., 2018, C:6 (11956), 5 pages.
Lin et al., "Ring Shuttling Controls Macroscopic Motion in a Three-Dimensional Printed Polyrotaxane Monolith," Chem. Int. Ed., 2017, 56:4452-4457, 7 pages.
Liu et al., "A novel method to evaluate cement shale bond strength," SPE-173802-MS, Society of Petroleum Engineers (SPE), presented at the SPE International Symposium on Oilfield Chemistry, The Woodlands, Texas, Apr. 13-15, 2015, 20 pages.
Liu et al., "Graphene Lubricant," Applied Materials Today, 2020, 20:2020 (100662), 31 pages.
Loizzo et al., "Reusing O&G-Depleted Reservoirs for CO2 Storage: Pros and Cons" SPE Projects, Facilities & Construction, Sep. 2010, 5, 166-172, 10 pages.
Luo et al., "A survey of finite element analysis of temperature and thermal stress fields in powder bed fusion additive manufacturing," Additive Manufacturing, May 2018, 21:318-332, 15 pages.
Mather et al., "Michael addition reactions in macromolecular design for emerging technologies," Progress in Polymer Science, May 2006, 31.5:487-531, 45 pages.
Mayumi et al., "Structure and dynamics of polyrotaxane and slide-ring materials," Polymer, 2010, 51:959-967, 9 pages.
Metz et al., "The IPCC Special Report on Carbon Dioxide Capture and Storage" in Working Group III of the Intergovernmental Panel on Climate Change, Sep. 22-24, 2005, 33 pages.
Mikhalchan et al., "Aligned carbon nanotube-epoxy composites: the effect of nanotube organization on strength, stiffness, and toughness," J. Mater. Sci., 2016, 51:10005-10025, 21 pages.
Mostafaei et al., "Binder jet 3D printing—Process parameters, materials, properties, modeling, and challenges," Progress in Materials Science, Jun. 2021, 119:100707, 141 pages.
Nakahata et al., "Self-Healing Materials Formed by Cross-Linked Polyrotaxanes with Reversible Bonds," Chem, 2016, 1:5 (766-775), 11 pages.
Nelson and Guillot, Well Cementing 2nd Ed., Schlumberger, 2006, 807 pages.
Obayi et al., "Effect of grain sizes on mechanical properties and biodegradation behavior of pure iron for cardiovascular stent application," Biomatter, Jan. 2016, 6.1:e959874, 10 pages.
Ohm et al., "Liquid Crystalline Elastomers as Actuators and Sensors," Advanced Materials, Aug. 2010, 22: 3366-3387, 22 pages.
Oliveira et al., "Processing parameters in laser powder bed fusion metal additive manufacturing," Materials & Design, Aug. 2020, 193, 12 pages.
Opedal et al., "Experimental study on the cement-formation bonding," SPE 168138, Society of Petroleum Engineers (SPE), presented at the SPE International Symposium and Exhibition on Formation Damage Control,Lafayette, Louisiana, Feb. 26-28, 2014, 12 pages.
Pau et al., "High-resolution simulation and characterization of density-driven flow in CO2 storage in saline aquifers" Advances in Water Resources, 33, 443-455, Apr. 2010, 27 pages.
Payenberg et al., "Architecture of a deep-water, salt-withdrawal mini-basin, Donkey Bore Syncline, Australia," in Nilse et al., Atlas of Deep-Water Outcrops, Jan. 2008, 5 pages.

Peerzada et al., "Additive Manufacturing of Epoxy Resins: Materials, Methods, and Latest Trends," Ind. Eng. Chem. Res., 2020, 59:14, 52 pages.
Prabhakar et al., "Enhancing the Gel Transition Time and Right-Angle-Set Property of Oil Well Cement Slurries by Incorporating CSA Cement and Gypsum" IPTC-19224-MS, International Petroleum Technology Conference, Mar. 2019, 12 pages.
Prajapati et al., "Measurement of anisotropic thermal conductivity and inter-layer thermal contact resistance in polymer fused deposition modeling (FDM)," Additive Manufacturing, May 2018, 21:84-90, 7 pages.
Pruksawan et al., "Homogeneously Dispersed Polyrotaxane in Epoxy Adhesive and Its Improvement in the Fracture Toughness," Macromolecules, 2019, 52:2464-2475, 12 pages.
Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.
Ramsdale-Capper et al., "Internal antiplasticisation in highly cross-linked amine cured multifunctional epoxy resins." Polymer 146, Jun. 2018, 321-330, 10 pages.
Reddy et al., "Relating Cement Additive Performanace to Mix Water Composition for Deep Water and Salt Zone Applications" SPE-180344-MS, Society of Petroleum Engineers, SPE Deepwater Drilling and Completions Conference 2016, Sep. 2016, 20 pages.
Rimdusit et al., "Shape memory polymers from benzoxazine-modified epoxy," Smart Mater. Struct., 2013, 22:075033, 13 pages.
Ringrose, "How to store CO2 underground: insights from early-mover CCS projects" Springer, 2020, 141 pages.
Roca et al., "Policy needed for additive manufacturing," Nature Materials, Aug. 2016, 15:8, 4 pages.
Saed et al., "Molecularly-engineered, 4D-Printed liquid crystal elastomer actuators," Advanced Functional Materials, 2019, 29.3, 9 pages.
Sajadi et al., "Direct ink writing of cement structures modified with nanoscale additive," Advanced Engineering Materials, Aug. 2019, 21.8:1801380, 10 pages.
Seo et al., "Development of a supramolecular accelerator simultaneously to increase the cross-linking density and ductility of an epoxy resin," Chem. Eng. J., 2019, 356:303-311, 30 pages.
Seo et al., "Enhanced Mechanical Strength, Flexibility, and Shape-Restoring Rate of a Drug-Eluting Shape-Memory Polymer by Incorporation of Supramolecular Cross-Linkers," ACS Macro Lett., 2020, 9, 389-395, 7 pages.
Simao et al., "Cementing Solutions for Salt- and CO2-Laden Presalt Zones" SPE-180336-MS, SPE Deepwater Drilling and Completions Conference Proceedings, Sep. 2016, 11 pages.
Singh et al., "Powder bed fusion process in additive manufacturing: An overview," Materials Today: Proceedings, Jan. 2020, 26:3058-3070, 13 pages.
Snow et al., "Invited Review Article: Review of the formation and impact of flaws in powder bed fusion additive manufacturing," Additive Manufacturing, Jul. 2020, 15 pages.
Soto et al., "Self-assembly of a supramolecular network with pseudo-rotaxane cross-linking nodes and its transformation into a mechanically locked structure by rotaxane formation," Chemical Communications, 2016, 52:14149, 5 pages.
Sun et al., "Short-aramid-fiber toughening of epoxy adhesive joint between carbon fiber composites and metal substrates with different surface morphology," Compos. Part B Eng., 2015, 77:38-45, 30 pages.
Tagliaferri et al., "Direct ink writing of energy materials," Materials Advances, 2021, 2.2:540-563, 24 pages.
Tao et al., "A Brief Review of Gas Migration in Oilwell Cement Slurries" Energies, 14, 2369, 2021, 22 pages.
Telschow et al., "Cement Formation—A Success Story in a Black Box: High Temperature Phase Formation of Portland Cement Clinker," Industrial & Engineering Chemistry Research (I&EC Research), American Chemical Society (ACS Publications), Jul. 2012, 51:34 (10983-11004), 22 pages.

(56) References Cited

OTHER PUBLICATIONS

Tong et al., "Committed Emissions from Existing Energy Infrastructure Jeopardize 1.5° C. Climate Target," Nature, 2019, 572:7769 (373-377), 17 pages.
Tran et al., "3D printing of highly pure copper," Metals, Jul. 2019, 9.7:756, 24 pages.
United States Enviornmental Protection Agency, "UIC Pressure Falloff Testing Guideline" EPA Region 6, Aug. 8, 2002, 29 pages.
Ürk et al., "Structure-controlled growth of vertically-aligned carbon nanotube forests using iron-nickel bimetallic catalysts," Materials Advances, 2021, 2:2021-2030, 10 pages.
Utela et al., "A review of process development steps for new material systems in three dimensional printing (3DP)," Journal of Manufacturing Processes, Jul. 2008, 10.2:96-104, 9 pages.
Vyavahare et al., "Fused deposition modelling: A review," Rapid Prototyping Journal, Jan. 2020, 26 pages.
Wang et al., "Molecular Simulation of CO2/CH4 Competitive Adsorption on Shale Kerogen for CO2 Sequestration and Enhanced Gas Recovery," J. Phys. Chem. C, 2018, 122:30 (17009-17018), 29 pages.
Wang et al., "Relaxation and Reinforcing Effects of Polyrotaxane in an Epoxy Resin Matrix," Macromolecules, 2006, 39:3 (1046-1052), 7 pages.
Weir et al., "Reservoir storage and containment of greenhouse gases" Energy Conversion and Management 36.6-9, Jun. 1995, 531-534, 4 pages.
Welch et al., "Shear strength and permeability of the cement-casing interface," International Journal of Greenhouse Gas Control, Apr. 2020, 95, 29 pages.
Wenz et al., "Cyclodextrin Rotaxanes and Polyrotaxanes" Chemistry Reviews 106, No. 3, 2006, 106, 782-817, 36 pages.
Wimpenny et al., "Advances in 3D printing & additive manufacturing technologies," Singapore: Springer, 2017, 195 pages.
Wu et al., "A Crown Ether-Containing Copolyimide Membrane with Improved Free Volume for CO2 Separation," Industrial & Engineering Chemical Research, 2019, 58:14357-14367, 44 pages.
Wu et al., "High-strain slide-ring shape-memory polycaprolactone-based polyurethane," Soft Matter, 2018, 14:4558, 28 pages.
Yakovlev et al., "Modification of Cement Matrix Using Carbon Nanotube Dispersions and Nanosilica," Science Direct, Procedia Engineering, Modern Building Materials, Structures and Techniques, MBMST 2016, 2017, 172:1261-1269, 9 pages.
Zhan et al., "In situ-grown carbon nanotubes enhanced cement-based materials with multifunctionality," Cement and Concrete Composites, Apr. 2020, 108:103518, 11 pages.
Zhang et al., "Dibenzo-21-crown-7-ether contained 6FDA-based polyimide membrane with improved gas selectivity," Separation and Purification Technology, 2021, 264:118454, 13 pages.
Zhang et al., "Three-Dimensional Printing of Continuous Flax Fiber-Reinforced Thermoplastic Composites by Five-Axis Machine," Materials, 2020, 13:1678, 11 pages.
Zoback, "Reservoir geomechanics," Cambridge University Press, 2010, 2 pages.

* cited by examiner

326

|—————| 1cm

CEMENTING A WELLBORE USING A DIRECT INK PRINTING

TECHNICAL FIELD

The present disclosure generally relates to methods and compositions for cementing a wellbore, more particularly methods for printing cement-based composite structures to cement the wellbore.

BACKGROUND

During the primary well cementing process, cement is placed in the annulus between the rock formations of the wellbore and the steel casing in order to provide an impermeable seal and achieve zonal isolation. Complete and durable zonal isolation, or preventing the flow of fluids between zones in the well, is the foremost goal of cementing. The quality of the cement work has a direct impact on the economic longevity of the well throughout the life of producing oil and gas and the efficacy of the primary cementing operation is governed by the well production and performance over the life of the well.

It is estimated that the petroleum industry invests over 450 million dollars annually to repair the cement sheath using a process of cement squeezing, varying operational procedures during cement placement, incorporating additives to improve curing behavior, changing the composition in the Portland cement by blending elastic materials, and the like.

SUMMARY

This specification describes cement/polyrotaxane composite structures for use in a wellbore, and methods to cement a wellbore using such composite structures. The methods provide cementing the wellbore using cement-based composites with improved structural architecture and mechanical properties for use in oil and gas wells. In general, the methods for cementing the wellbore include printing of cement-based composites using a direct ink writing. The direct ink writing is a type of printing process that uses ink to create complex composite structures that include uniform distribution of forces exerted during the production of the cement matrix. The printed cement-based composite is produced with uniform distribution of forces, increased mechanical strength, and toughness that allows for pressure tight seal between the casing and the formation.

The methods include forming a slurry that includes cement-based matrix (e.g., Portland cement), water, polymer-based additive (e.g., polyrotaxanes), and a rheology modifying agent (e.g., nanoclay). The slurry is mixed to form a printing ink for use with direct ink writing process. The methods include depositing or printing the ink to form a first composite layer on a substrate and continuing the same pattern to form a multiple equal layers stacked in a same orientation on top of one another that constitute a three dimensional (3D) cement-based composite structure with a uniform architecture. In some implementations, the 3D cement-based composite structure includes layers that are stacked on top of one another in different orientations forming a structure with a non-uniform architecture.

The described approach produces a cement-based composite for cementing a successful well construction and can reduce the annual cost for the petroleum industry (e.g., estimated at $450 million/per year) by preventing failure of primary cementing jobs (e.g., approximately 15% per year) that have been unable to overcome the failure in the oil well cement sheath. The produced cement-based composite using the direct ink writing process includes composition with uniformly distributed stressed that prevent formation of cracks and fractures that can compromise safety, production, and the total life of the oil well.

In some aspects, a method for cementing a wellbore includes forming a slurry including a cement-based matrix, water, a polymer-based additive, and a rheology modifying agent; mixing the slurry to form a printing ink; introducing the slurry and a printer into a wellbore; and forming a cement-based composite structure in the wellbore by printing a plurality of layers using the printing ink.

Embodiments of the method for cementing a wellbore can include one or more of the following features.

In some embodiments, the method includes direct ink printing a second cement-based composite structure outside the wellbore before introducing the slurry and the printer into the wellbore. In some cases, the method includes testing material properties of the second cement-based composite structure outside the wellbore before introducing the slurry and the printer into the wellbore.

In some embodiments, the method includes introducing the slurry and the printer into the wellbore by running the printer and an attached reservoir downhole in the wellbore.

In some embodiments, the method includes introducing the slurry and the printer into the wellbore by running the printer and attached supply tubing downhole in the wellbore. In some cases, the method includes pumping the slurry downhole to the printer through the attached supply tubing.

In some embodiments, the method includes mixing the cement-based matrix with the polymer-based additive, wherein the polymer-based additive is polyrotaxanes. In some cases, the method includes adding the mixed cement-based matrix with the polyrotaxanes into the water solution. In some cases, the method includes adding the polycarboxylate ether and defoamer to the slurry solution. In some cases, the defoamer is 2-Ethyl-1-hexanol. In some cases, the rheology modifying agent is a hydrophilic bentonite.

In some embodiments, the cement-matrix of the method includes Class A, Class B, Class C, Class G, Class H, or combinations thereof. In some cases, the method includes forming the slurry solution by adding 77 g of cement-matrix in 23 g of water, 70 g of cement-matrix in 30 g of water, 60 g of cement-matrix in 40 g of water, 50 g of cement-matrix in 50 g of water or combinations thereof.

In some embodiments the method includes curing the plurality of printed layers under ambient conditions.

In some embodiments forming the cement-matrix includes adding polyrotaxanes additive between 0.5% and 20%, between 1% and 10%, and between 2% and 5%, or other % within these ranges and based on the weight of the cement present.

In some aspects, asystem for cementing a wellboreincludes a slurry pumped into a wellbore including a cement-based matrix, water, a polymer-based additive, and a rheology modifying agent and configured to form a printing ink; a printer deployed into the wellbore including a printing head with the printing ink and configured to print 3D cement-based composite structures by depositing a plurality of layers of the printing ink when pressurized; and a supply tubing attached to the printer and operable to pass the pumped slurry to the printer and begin the cementing of the wellbore by printing the 3D cement-based composite structures.

The integration of polyrotaxanes additive in the cement-based composite structure formed by direct ink writing method is expected to provide durability of the cement sheath with increased effectiveness over repeated cycles of stresses imposed in the well.

The details of one or more embodiments of these methods are set forth in the accompanying drawings and the description below. Other features, objects, and advantages of these methods will be apparent from the description, drawings, and claims.

DETAILED DESCRIPTION

This specification describes cement/polyrotaxane composite structures for use in a wellbore, and methods that can be used to fabricate cement a wellbore using such composite structures. The methods provide cementing the wellbore using cement-based composites with improved structural architecture and mechanical properties for use in oil and gas wells. In general, the printing methods for cementing the wellbore include printing of cement-based composites using a direct ink writing. The direct ink writing is a type of printing process that uses ink to create complex composite structures that include uniform distribution of forces exerted during the production on of the set-cement matrix. The printed cement-based composite is produced with uniform distribution of forces, increased mechanical strength, and toughness that allows for pressure tight seal between the casing and the formation.

The methods include forming a composite slurry that includes a cement-based matrix (e.g., Portland cement), water, polymer-based additive (e.g., polyrotaxanes), and a rheology modifying agent (e.g., nanoclay). The slurry is mixed to form a printing ink for use with direct ink writing process. The methods include depositing or printing the composite ink to form a first composite layer on a substrate and continuing the same pattern to form a multiple equal layers stacked in a same orientation on top of one another that constitute a three dimensional (3D) cement-based composite structure with a uniform architecture. In some implementations, the 3D cement-based composite structure includes layers that are stacked on top of one another in different orientations forming a structure with a non-uniform architecture.

The described approach produces a cement-based composite for use in cementing a successful well construction that and can reduce the annual cost for the petroleum industry (e.g., estimated at $450 million/per year) by preventing failure of primary cementing jobs (e.g., approximately 15% per year) that have been unable to overcome the failure in the oil well cement sheath.

Figure 1:
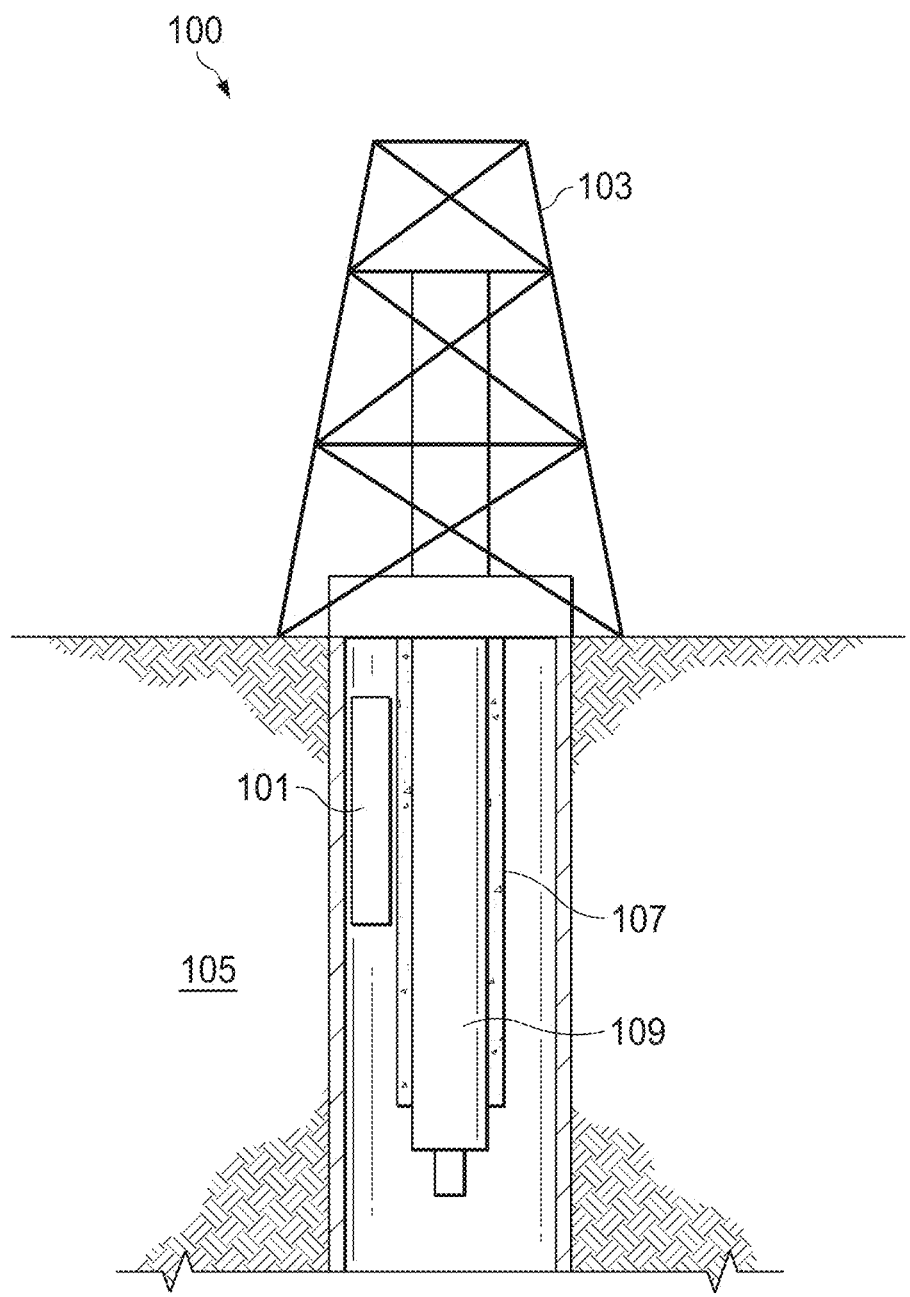
FIG. 1 is a schematic view of a wellsite that includes a direct ink printing equipment for cementing a wellbore.

FIG. 1 is a schematic view of a wellsite 100 that includes a direct ink printing equipment 101 deployed in the wellbore 105 to cement the wellbore 105. The direct ink printing equipment 101 can extrude cement slurries under controlled pressure and temperature conditions within the wellbore. In some embodiments, the direct ink printing equipment 101 is deployed downhole as part of a wireline assembly. As illustrated, the wellsite 100 includes a derrick 103 that supports a production tubing 109 that is run in the wellbore 105. The direct ink printing equipment 101 is configured to apply cement 107 within the wellbore 105. The cement 107 can be used to seal the annulus after a production tubing 109 has been run in the wellbore 105. A single direct ink printing equipment 101 is shown for clarity, but multiple direct ink printing stations may be installed. In this example, the direct ink printing equipment 101 allows cementing of the wellbore by printing.

Figure 2:
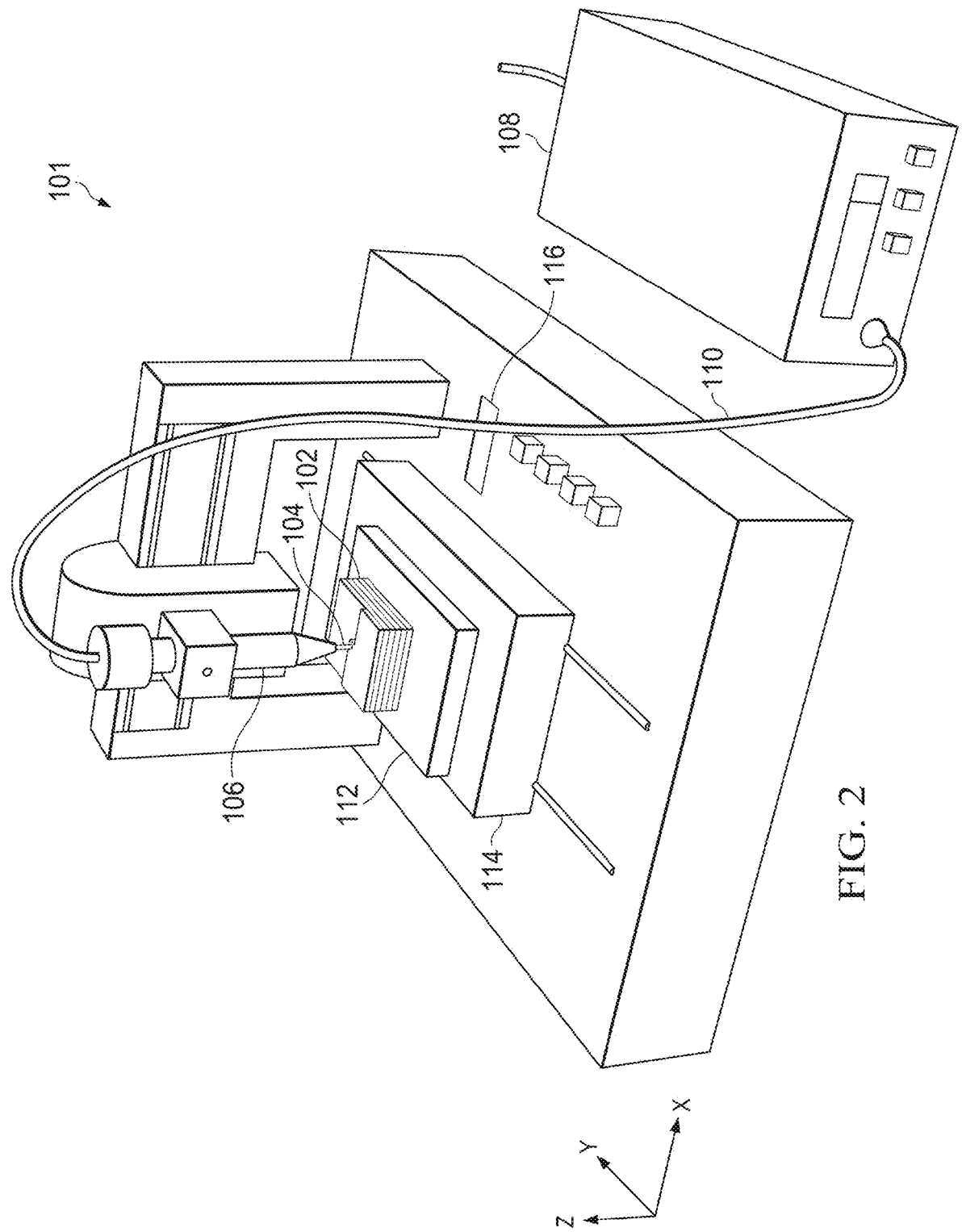
FIG. 2 is a schematic view of an example of direct ink printing equipment including a 3D printed cement-based composite structure.

FIG. 2 is a schematic view of direct ink printing equipment 101 used to produce 3D printed cement-based composite structures 102 for testing. During the primary well cementing process, cement is placed in the annulus between the rock formations of the wellbore and the steel casing in order to provide an impermeable seal and achieve zonal isolation. Complete and durable zonal isolation, or preventing the flow of fluids between zones in the well can be achieved by cementing. Failure in the cement can be observed throughout the life of the well. However, of particular importance observing the cement for failure during the initial placement. For example, gas and fluid migration phenomena at the time of the placement of the cement, due to improper balancing of the pressures, can allow gas and fluid influx into the cement-filled annulus. At the initial cement placement, there also can be misplacement between the drilling fluids and the placed cement. For example, if the drilling fluids are not effectively displaced, the blending of drilling mud with the cement can lead to complications in cement hydration, setting profiles, and mechanical properties of the cement. Dynamic pressure differentials between the casing and the formation can also impart harmful stresses upon the cement sheath.

The direct ink printing method allows for production of cement-based composite structures 102 with improved mechanical properties that prevent failure of the cement sheath under stress. The direct ink printing method uses 3D printer 101 (e.g., Hyrel3D 30M system), at room temperature, to fabricate 3D cement-based composite structures 102 by depositing layers of cement-based ink 104. The 3D printer 101 includes a cold flow syringe head 106 (e.g., SDS-30 and SDS-150) to print the 3D composite structures 102. The 3D printer 101 is attached to a pressure controller 108 via an air pressure pipe 110 that pressurizes the syringe head 106 to deposit the ink 104. The ink 104 is deposited on a substrate 112 (e.g., rubber lined glass plate) that facilitates ease of post structure removal from the print bed. The substrate 112 is placed on a moving stage 114 that can move in x, y, and z-directions. Prior to printing, the user uses software (e.g., Slic3r based on a G-code script) to generate a specific printing job that includes a type of structure (e.g., compression or flexural) to be printed, layer height, print pattern and geometry, printing speed, and printing orientation. The display screen 116 shows the printing job in progress. In operation, a multilayer deposition such as the composite structure 102 can include loading the ink 104, then printing, and processing the material until the final layer is deposited.

Figure 3:
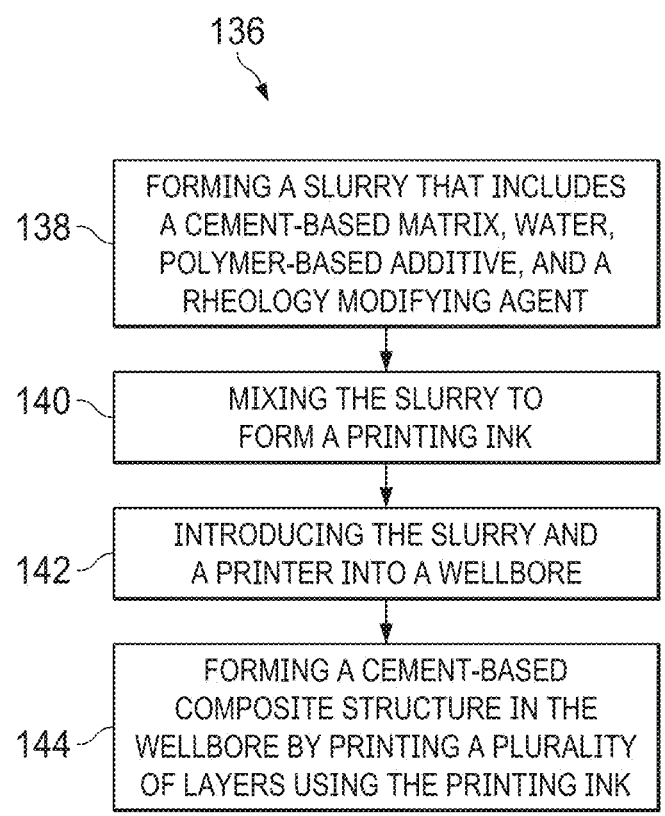
FIG. 3 is a flowchart showing a method for cementing a wellbore.

FIG. 3 is a flowchart showing a method 136 for cementing a wellbore 105 using the printed cement-based composite structures 102. At step (138) the method includes forming a slurry that includes a cement-based matrix (e.g., Portland cement), water, polymer-based additive (e.g., polyrotaxanes), and a rheology modifying agent (e.g., nanoclay). In some examples, the cement-based matrix includes one or more of American Petroleum Institute (API) classes such as Class A, Class B, Class C, Class G, Class H, or combinations thereof. In an example of this method, a 70 grams (g) of Class G cement (available from Dyckeroff AG, Germany) is mixed with a slurry. The slurry includes 5.6 g of rheology modifying agent or nanoclay (e.g., hydrophilic bentonite available from Sigma-Aldrich, USA) which can contribute as an accelerant to facilitate the setting of a cement matrix, 0.35 mL of polycarboxylate ether (e.g., Ethacryl G, available from Coatex, USA), 0.35 mL of defoamer (e.g., 2-Ethyl-1-hexanol, available from Sigma-Aldrich, USA), and 20 g of water. At step 140, the slurry is mixed to form a printing ink suitable for use with the direct ink writing process. Prior to and after adding the Class G cement to the slurry, the slurry was mixed in a planetary centrifugation apparatus (e.g., AR-310) using three zirconium balls with size of ¼ inches in diameter. The mixing was done at speed of 2000 revolutions per minute (RPM), at temperature of 25 Celsius (° C.), and at pressure of 1 bar for 4 minutes before and after the Class G cement was added.

In general, the ratio of the cement to water can be adjusted to control the properties of the ink 104. In the example above, the Class G cement was present at 70 g in a 20 g of water. More generally, the Class G cement can be present at 77 g in 23 g of water, at 70 g to 30 g of water, at 60 g to 40 g of water, at 50 g to 50 g of water or other ratio within these ratios.

In general, the quantity of the rheology modifying agent (e.g., nanoclay) can be adjusted to provide a sufficient viscosity of the ink 104 so that desired 3D printed structures can be produced. In the example above, the nanoclay was present at 5.6 g. More generally, the nanoclay can be present between 1% and 20%, between 2% and 15%, and between 5% and 10%, or other % within these ranges and based on the weight of the cement present.

In general, the quantity of the polycarboxylate ether can also be adjusted. In the example above, the polycarboxylate ether was present at 0.35 mL. More generally, the polycarboxylate ether can be present between 0.01% and 1%, between 0.1% and 0.75%, and between 0.4% and 0.5%, or other % within these ranges and based on the weight of the cement present. Similarly, the quantity of the defoamer can be adjusted. In the example above, the defoamer was present at 0.35 mL. More generally, the defoamer can be present between 0.01% and 1%, between 0.1% and 0.75%, and between 0.4% and 0.5%, or other % within these ranges and based on the weight of the cement present.

In general, the mixing speed, the temperature, the pressure, and the time can also be adjusted. More generally, the slurry can be mixed at a speed between 100 and 10,000 RPM, between 500 and 5,000 RPM, between 1,000 and 2,000 RPM or other speed within these ranges. More generally, the slurry can be mixed at a temperature between 15 and 40° C., between 2° and 30° C., between 22 and 26° C. or other temperature within these ranges. More generally, the slurry can be mixed at ambient pressure or at a pressure between 0 and 5 bars or other pressure within these ranges. More generally, the slurry can be mixed at a time between 1 and 10 minutes, between 2 and 6 minutes, between 3 and 4 minutes or other time within these ranges.

In another example of this method, the Class G cement was mixed with 5.3 g (or 5 wt %) of polymer-based additive (e.g., polyrotaxanes or PRB available from Advanced Softmaterials, Inc., Japan) then added to the slurry as described above.

Figure 4:
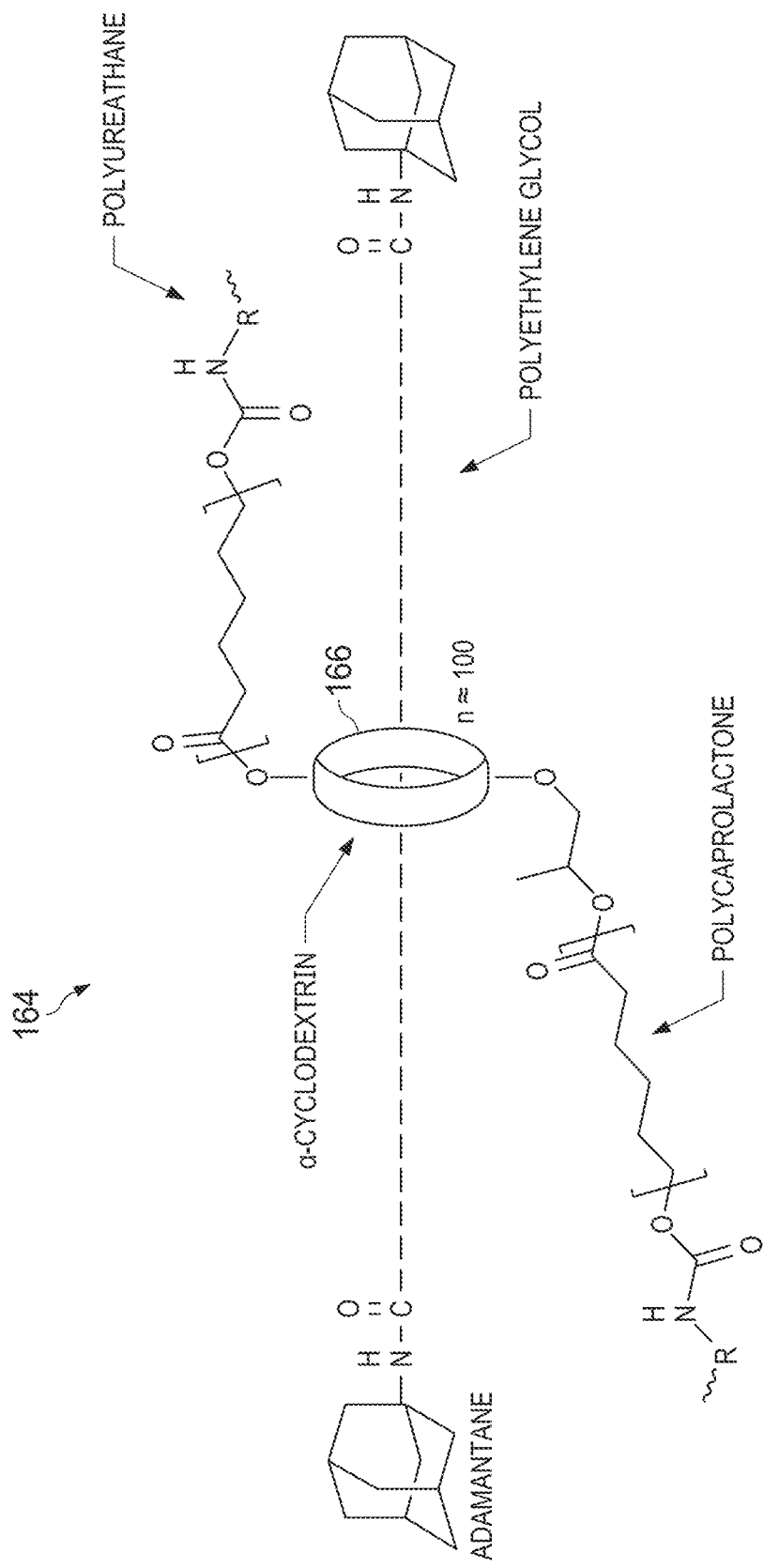
FIG. 4 is a schematic showing a chemical structure of a polyrotaxanes additive.
Figure 5A:
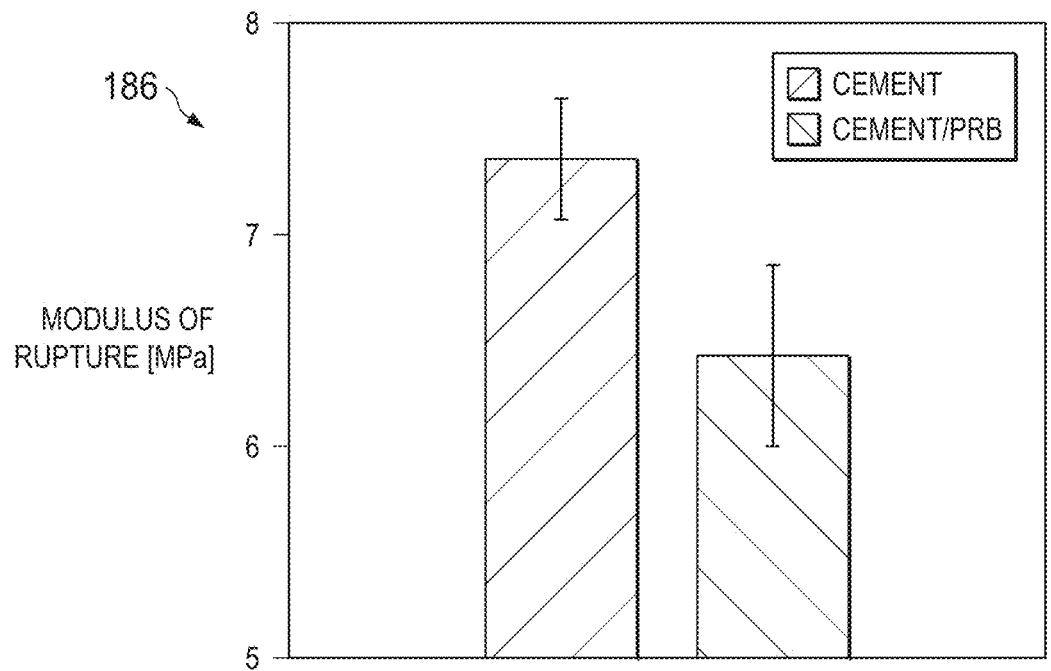
FIGS. 5A-SD are charts showing overall mechanical properties of a cement sample and a cement with a polyrotaxanes additive sample.
Figure 5B:
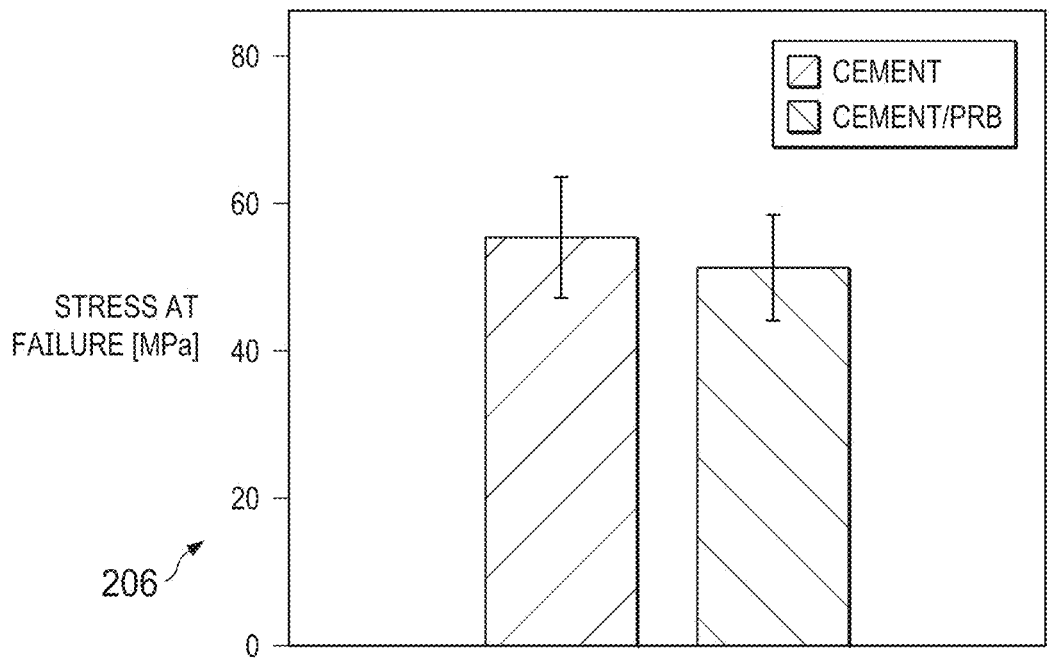
Figure 5C:
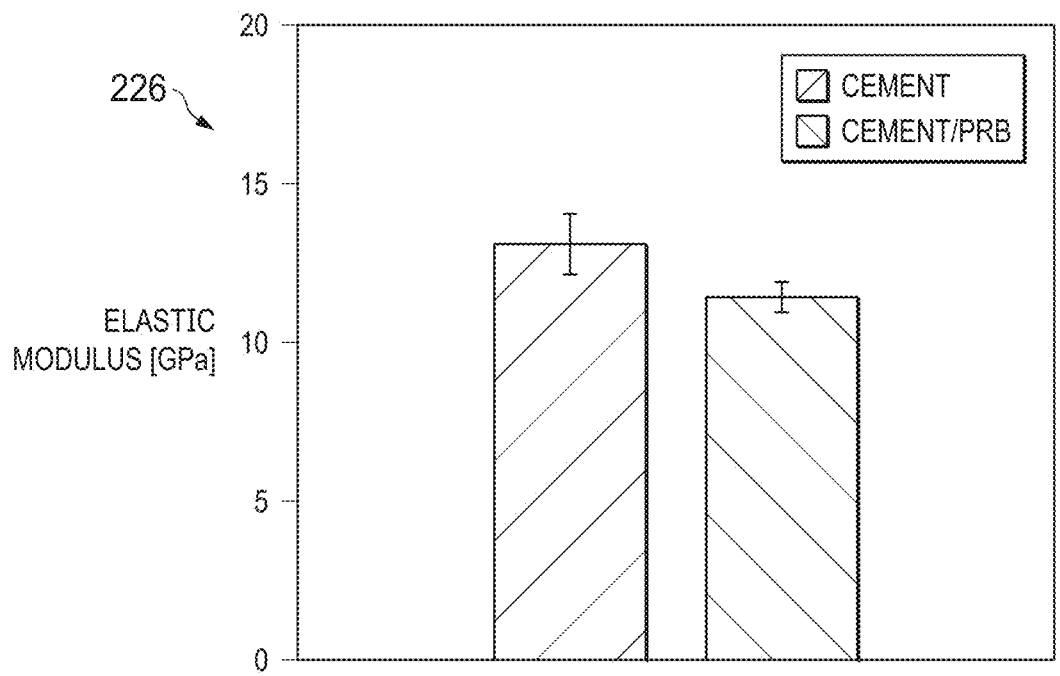
Figure 5D:
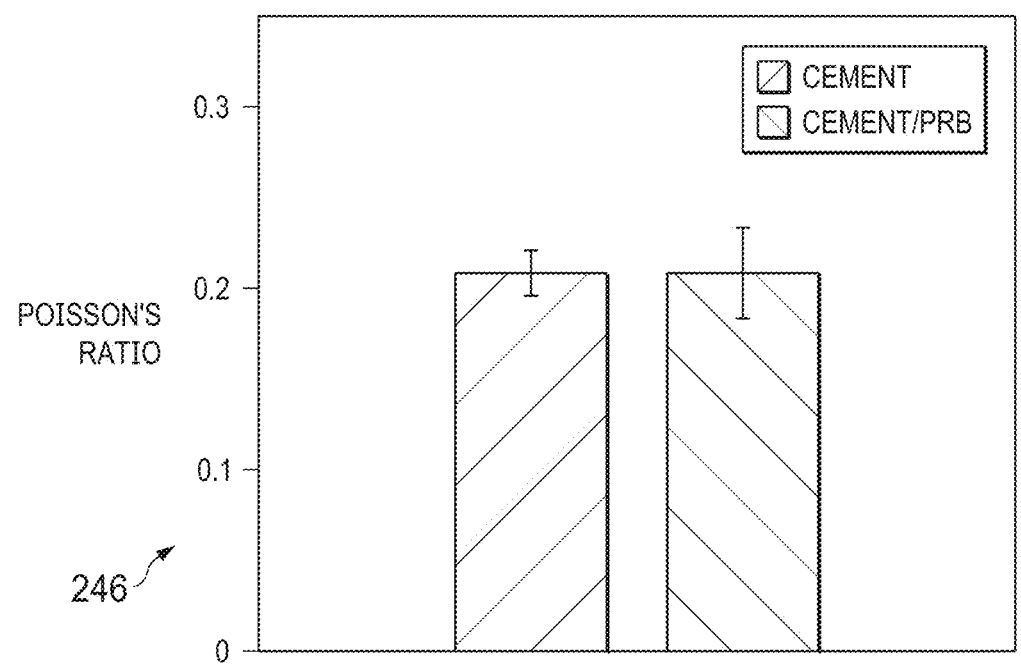

FIG. 4 is a schematic showing a chemical structure 164 of a polyrotaxanes additive. The polyrotaxanes additive includes a cross-linked structure composed from a sliding ring 166 and a combination of other polymers (e.g., alpha-cyclodextrin, polyethylene glycol, polycaprolactone, and polyurethane). The cyclic molecule can move and rotate on the linear polymer chain and that provides molecular movement at sub-nanometer scale. These molecular motions can provide uniform stress distribution within the matrix materials (e.g., cement-matrix) and can improve the mechanical properties of the printed cement-based composite. In general, the quantity of the polyrotaxanes additive can be adjusted. In the example above, the polyrotaxanes additive was present at 5.3 g. More generally, the polyrotaxanes additive can be present between 0.5% and 20%, between 1% and 10%, and between 2% and 5%, or other % within these ranges and based on the weight of the cement present.

Referring back to FIG. 3. At step 142, the slurry and a printer (e.g., direct ink writing) are deployed downhole by pumping the slurry downhole to the printer through an attached supply tubing. In some implementations, the printer can be run along with the attached supply tubing and an attached reservoir downhole in the wellbore. At step 144, after mixing of the prepared slurry to form the ink 104 and being run downhole, the ink 104 is used to print the 3D cement-based composite structures 102. The 3D cement-based composite structure 102 is formed by printing a plurality of layers using the printing ink. In some implementations, the method 136 includes direct ink printing of a second cement-based composite structure outside the wellbore before introducing the slurry and the printer into the wellbore. The printed second cement-based composite structure outside the wellbore can be used for evaluating and testing material properties of the printed composite structure. In an example of this method, two composite structures were printed a neat cement and a cement with PRB additive composite. In this example, a printing speed of between 5 ft/min and 32 ft/min with 14 gauge nozzle was used. The deposition time depends on the structure size, number of layers deposited, layers thickness, and the size of the nozzle. In this example, between 10 and 60 layers with 1 mm thickness: were deposited. The pressure used was atmospheric pressure and room temperature of 25° C. The 3D cement-based composite structures were set to cure at ambient conditions (e.g., room temperature and atmospheric pressure) for 24 hours and under water spray (e.g., Reptile Humidifer). Additionally, the 3D cement-based composite structures were cured for seven days submerged in water at ambient conditions.

The mechanical properties of a neat cement printed sample, and a cement with PRB additive printed sample was evaluated using a flexural strength system and a triaxial measurement system (e.g., AutoLab 3000). The samples were machined (e.g., in a rectangular or cylindrical shape) and polished prior to mechanical testing. The rectangular samples have dimensions of 1×1 centimeters (cm) in width, and 8 cm in thickness and 8 cm were used for flexural strength measurements using universal testing system (e.g., Instron) with center point loading at an extension rate of 0.15 mm/minutes. The changes in the axial strain upon applied cyclic stresses over 4 cycles were recorded and the elastic modulus was calculated from the slope. The cylindrical samples have dimensions of 2 inches (in) in length, and 1 in in diameter and were used for triaxial measurements under confined environment. The AutoLab 3000 system includes a customized servo-hydraulic operated system for triaxial measurements with software-controlled arbitrary stress paths on specimens at in situ stress conditions, pore pressure, and set temperature. The cylindrical samples were loaded in the loading cell and the compressive strength and Young's modulus were measured under ambient temperature and pressure between 5 and 20 MPa. Static mechanical properties were measured using strain gauges mounted on the samples to measure axial deformation and radial deformation.

FIGS. 5A-5D are charts 186, 206, 226, 246 showing overall mechanical properties of a cement sample and a cement with a polyrotaxanes additive sample. Changing the amount of PRB in cement-based matrix can control the modulus of rupture, the compressive strength, the Poisson ratio, and the elastic modulus. The modulus of rupture is the strength that the sample can sustain before rupture. In this example, a low modulus of rupture for the cement with a polyrotaxanes additive sample was observed compared to the neat cement sample. The modulus of rapture for the neat cement sample and the cement with a polyrotaxanes additive sample is observed to be 7.37 MPa and 6.43 MPa, respectively. Consistent results was observed on continuously on six samples for each formulation. The low modulus of rapture reveals that the polyrotaxanes additive is enhancing the elastic behavior in cement-based composites. In some embodiments, the cement-based samples fabricated according to the method described herein can have a modules of rupture between 2 and 20 MPa, between 4 and 10 MPa, and between 5 and 7 MPa. In some embodiments, the cement-based samples fabricated according to the method described herein can have a compressive strength between 25 and 100 MPa, between 30 and 75 MPa, and between 40 and 60 MPa.

In some embodiments, the cement-based samples fabricated according to the method described herein can have a Poisson ratio between 0.1 and 0.4, between 0.15 and 0.3, and between 0.2 and 0.25. In this example, substantial changes in the Poison's ratio for both samples were observed. In some embodiments, the cement-based samples fabricated according to the method described herein can have a modulus of elasticity between 5 and 20 GPa, between 10 and 15 GPa, and between 12 and 13 GPa. The lower the elastic modulus values, the more elastic is the cement. In this example, the average elastic modulus was recorded to be 13.01 GPa for the neat cement and 11.56 GPa for the cement with a polyrotaxanes additive over four cycles derived from the slopes of the stress-strain curves at ambient conditions. This support the described approach of fabricating a cement-based composite with increased toughness as a result of uniform distribution of stresses in the cement matrix imposed by the polyrotaxanes additive.

Figure 6A:
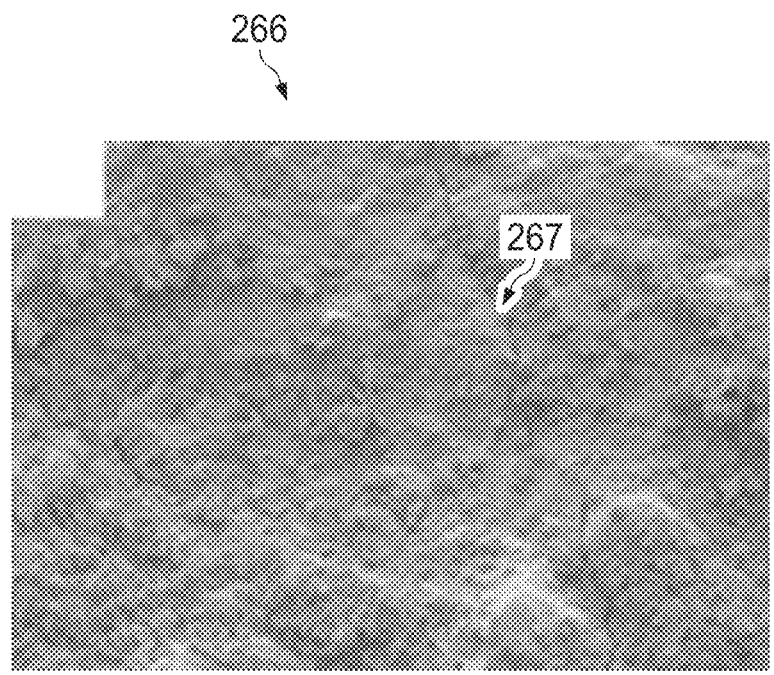
FIGS. 6A-6B are scanning electron micrographs showing a topography of a cement sample and a cement with a polyrotaxanes additive sample, respectively.
Figure 6B:
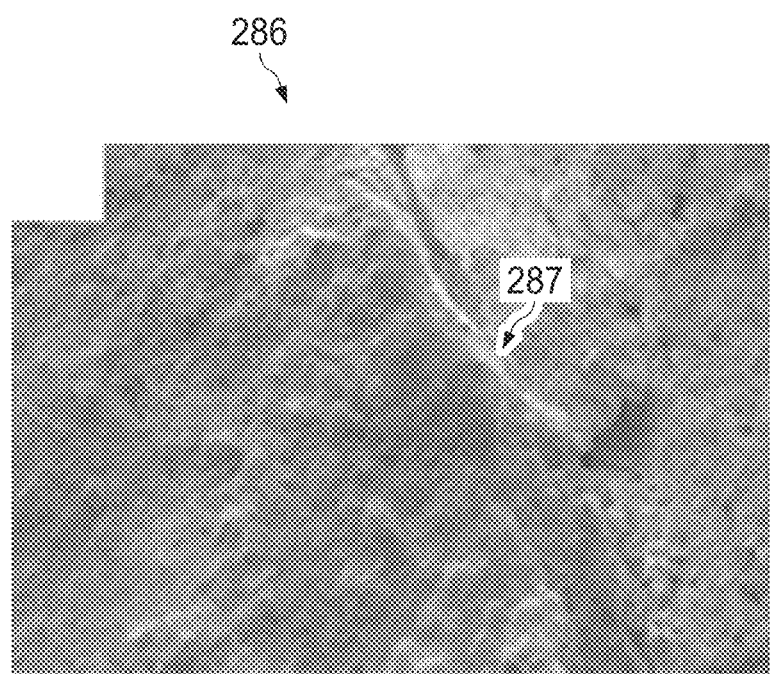
Figure 7A:
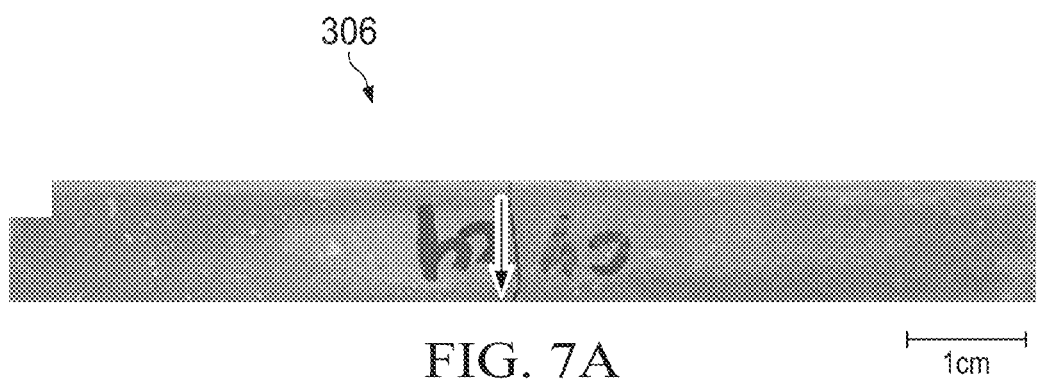
FIGS. 7A-7E are visual images showing the behavior of a cement sample under axial loading test.
Figure 7B:
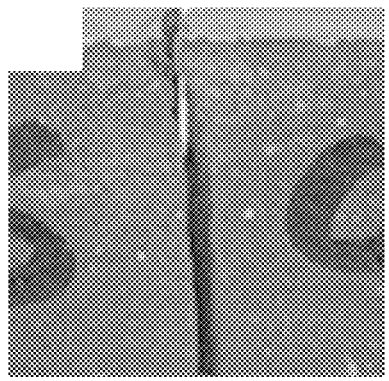
Figure 7C:
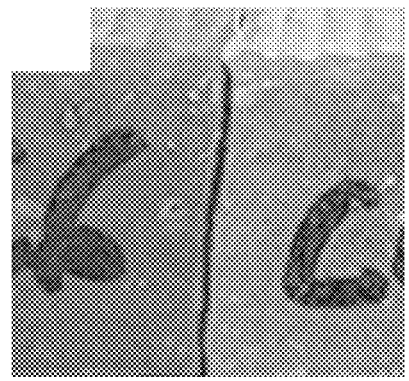
Figure 7D:
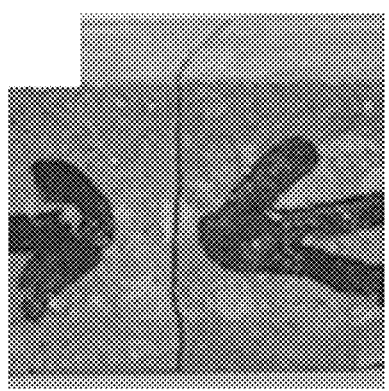
Figure 7E:
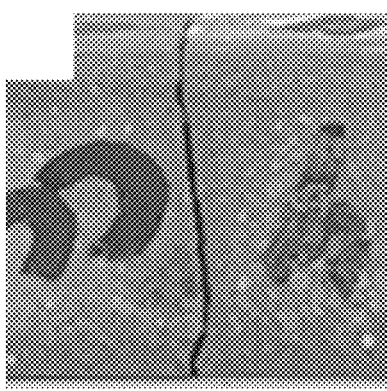

FIGS. 6A-6B are scanning electron micrographs (SEM) showing a topography of a neat cement sample 266 and a cement with a polyrotaxanes additive sample 286, respectively. The crack propagation pathways and failure modes in fractured neat cement 266 and cement with a polyrotaxanes additive 286 were analyzed through the SEM images. A formation of unidirectional micro cracks 267 are observed in the neat cement sample 266 while the cement with a polyrotaxanes additive 286 shows deflected micro cracks 287. The observations from the SEM images correspond to the compressive strength measured of 58.27 MPa for the neat cement sample 266, and a lower compressive strength of 54.6 MPa for the cement with a polyrotaxanes additive 286.

FIGS. 7A-7E are visual images 306 showing the behavior of a cement sample under axial loading test.

Figure 8A:
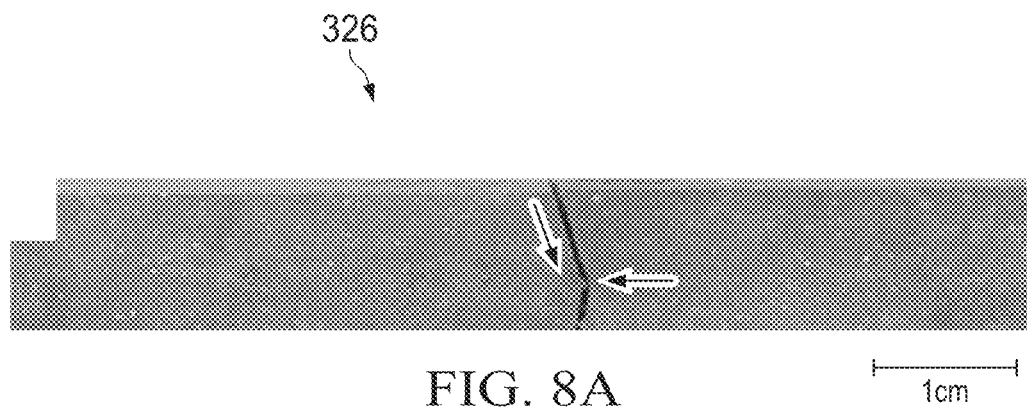
FIGS. 8A-SE are visual images showing the behavior of a cement with a polyrotaxanes additive sample under axial loading test.
Figure 8B:
Figure 8C:
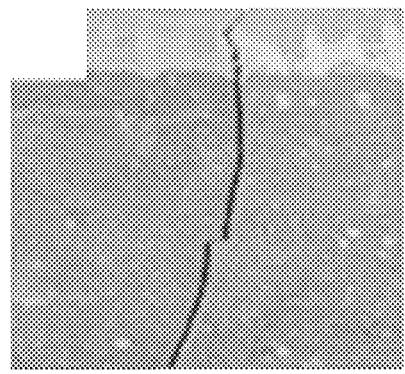
Figure 8D:
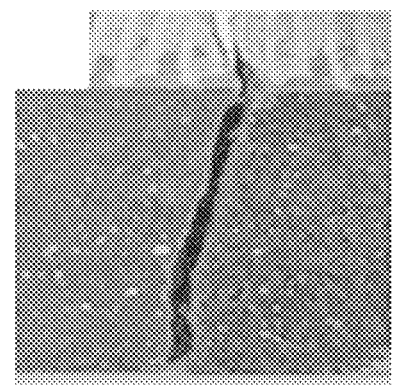
Figure 8E:
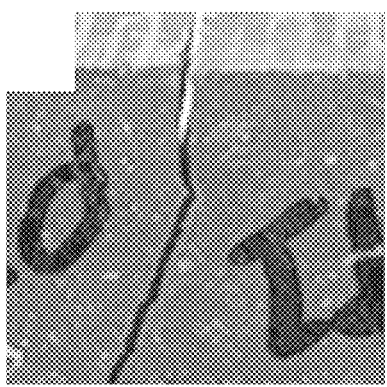

FIGS. 8A-8E are visual images 326 showing the behavior of a cement with a polyrotaxanes additive sample under axial loading test. The crack propagation through the cement with a polyrotaxanes additive sample shows higher angles of fracture with points of deflection during cracking and an average crack angle of 13.3° (FIG. 8A). This suggests that PRB loaded samples (FIGS. 8A-8E) could have higher fracture toughness than the neat cements samples (FIGS. 7A-7E). In the neat cement images 306, the crack growth occurred almost linearly with an average crack angle of 4.6°. The enhanced strain tolerance and crack deflection observed during flexural loading observed in the visual images 326 of the cement with a polyrotaxanes additive sample can be attributed to the sub-nanometer level uniform stress distribution inherent to the nature of the polyrotaxanes and the interface of the polyrotaxanes particles with the surrounding cement medium.

While this specification contains many specific implementation details, these should not be construed as limitations on the scope of what may be claimed, but rather as descriptions of features that may be specific to particular implementations. Features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

What is claimed is:

1. A method for cementing a wellbore, the method comprising:
    forming a slurry comprising a cement-based matrix, water, a polymer-based additive, and a rheology modifying agent;
    mixing the slurry to form a printing ink;
    introducing the slurry and a printer into a wellbore; and
    forming a cement-based composite structure in the wellbore by printing a plurality of layers using the printing ink;
    wherein introducing the slurry and the printer into the wellbore comprises running the printer downhole in the wellbore on a wireline.

2. The method of claim 1, further comprising direct ink printing a second cement-based composite structure outside the wellbore before introducing the slurry and the printer into the wellbore.

3. The method of claim 2, further comprising testing material properties of the second cement-based composite structure outside the wellbore before introducing the slurry and the printer into the wellbore.

4. The method of claim 1, wherein introducing the slurry and the printer into the wellbore comprises running the printer and attached supply tubing downhole in the wellbore.

5. The method of claim 4, further comprising pumping the slurry downhole to the printer through the attached supply tubing.

6. The method of claim 1, wherein forming a slurry solution comprises mixing the cement-based matrix with the polymer-based additive, wherein the polymer-based additive is polyrotaxanes.

7. The method of claim 6, wherein forming a slurry solution comprises adding the mixed cement-based matrix with the polyrotaxanes into the water solution.

8. The method of claim 7, wherein forming a slurry solution comprises adding the polycarboxylate ether and defoamer to the slurry solution.

9. The method of claim 8, wherein the defoamer comprises 2-Ethyl-1-hexanol.

10. The method of claim 8, wherein the rheology modifying agent comprises a hydrophilic bentonite.

11. The method of claim 1, wherein the cement-matrix comprises Class A, Class B, Class C, Class G, Class H, or combinations thereof.

12. The method of claim 11, where forming the slurry solution comprises adding 77 g of cement-matrix in 23 g of water, 70 g of cement-matrix in 30 g of water, 60 g of cement-matrix in 40 g of water, 50 g of cement-matrix in 50 g of water or combinations thereof.

13. The method of claim 1, wherein forming the cement-based composite structure further comprising curing the plurality of printed layers under ambient conditions.

14. The method of claim 1, wherein forming the cement-matrix comprises adding polyrotaxanes additive between 0.5% and 20%, between 1% and 10%, and between 2% and 5%, or other % within these ranges and based on the weight of the cement present.

15. A system for cementing a wellbore, the system comprising:
- a slurry pumped into a wellbore comprising a cement-based matrix, water, a polymer-based additive, and a rheology modifying agent and configured to form a printing ink;
- a printer deployed into the wellbore as part of a wireline assembly, the printer comprising a printing head with the printing ink and configured to print 3D cement-based composite structures by depositing a plurality of layers of the printing ink when pressurized; and
- a supply tubing attached to the printer and operable to pass the pumped slurry to the printer and begin the cementing of the wellbore by printing the 3D cement-based composite structures.

16. The system of claim 15, wherein the printer is attached to a reservoir downhole and operable to pass the pumped slurry to the printer and begin the cementing of the wellbore.

17. The system of claim 15, wherein the polymer-based additive of the slurry is a polyrotaxanes.

18. The system of claim 15, wherein the rheology modifying agent of the slurry is a hydrophilic bentonite.

19. The system of claim 15, wherein the cement-based matrix of the slurry is Class A, Class B, Class C, Class G, Class H, or combinations thereof.

* * * * *